3,639,604
COMPOSITIONS CONTAINING AN ORGANIC THIOCYANATE AND 2-HYDROXY ALKYL ESTERS OF ORGANIC THIOSULFONIC ACIDS AND PROCESSES OF UTILIZING THE SAME
Stanley J. Buckman, John D. Buckman, John D. Pera, and Fred W. Raths, Memphis, Tenn., assignors to Buckman Laboratories, Inc., Memphis, Tenn.
No Drawing. Filed Mar. 8, 1968, Ser. No. 711,507
Int. Cl. A01n 9/12, 9/22
U.S. Cl. 424—270
6 Claims

ABSTRACT OF THE DISCLOSURE

A 2-hydroxy alkyl ester of an organic thiosulfonic acid is added to a microbicidal composition containing an organic thiocyanate to combine with the hydrogen cyanide formed by the decomposition of the thiocyanate.

---

This invention relates to compositions and processes useful in various industrial processes for the purpose of controlling the growth and proliferation of microorganisms. More particularly, the present invention relates to the use of a solution containing an organic thiocyanate and a 2-hydroxy alkyl ester of an organic thiosulfonic acid to inhibit the growth of fungi and bacteria in industrial and agricultural processes and products.

Many industrial products, both during the process of manufacture and as the finished product, are normally susceptible to fungal and bacterial degradation if means are not taken to inhibit such degradation. Wood pulp, starch and proteinaceous substances, animal hides, vegetable tanning liquors, and leather are all damaged or degraded by the growth of fungi, bacteria, and other microorganisms or by enzymes produced by such growth. Growth of microorganisms in industrial water supplies—for example, in reservoirs or basins, spray ponds or heat exchangers, or in cooling towers—may produce slime or other solid accumulations which may interfere with the normal flow of the water or produce plugging or complete stoppage of the flow through pipes. In the case of heat exchangers such growths reduce the rate of heat transfer. Wet pulp containing more than about 30 pct. moisture content is subject to attack by stain, mold, and decay fungi and is a fertile substrate for the growth of bacteria. If not controlled, the result is a loss of useful fiber in badly decayed pulp, difficulty in dispersing partially decayed pulp, a darkening in color, and the development of undesirable odors caused by the growth of microorganisms. As another example, microorganisms frequently grow in liquid alum systems to the extent that pipe lines become plugged. Sulfate-reducing bacteria which are generally in waters used for the secondary recovery of petroleum are objectionable if not controlled. These microorganisms are able to reduce sulfates present in the injection water to sulfides which in turn react with soluble iron salts to form insoluble iron sulfide. As a result, matted deposits are produced consisting of sulfides, occluded oil, plus any other solids that may be present. Obviously this is undesirable because water containing such deposits when injected into suterranean formations causes plugging thereof. Furthermore, sulfate-reducing bacteria cause corrosion of metal by accelerating galvanic action. Different species of bacteria, yeast, and mold are encountered at various stages in the manufacture of leather. As an example, soaking provides an environment highly conductive to the growth of microorganisms, and even strong pickle solutions are subject to attack by some microorganisms; molds in particular may be troublesome and cause discoloration of the pickled stock, especially if it is held for a period of time. During the chrome tanning process, the chrome tanned stock held "in the blue" readily molds and is discolored. Mold growth may develop on heavy vegetable tanned leather during the drying period and produce spots and stains on either the flesh or grain sides.

The compositions of our invention are used as seed, plant, and soil fungicides for protecting seeds, seedlings emerging from seeds, and plants against attack by fungi, bacteria, and nematodes. An important use of our composition is the control of fungi and bacteria on fruits, vegetables, berries, flowers, tobacco, grasses, and cereals, and microorganisms and nematodes that are responsible for large economic losses in the agricultural field.

In addition, many fungi and bacteria which inhabit soils are responsible for both preemergence and postemergence damping off of seedlings as well as other deleterious effects. As a result, improved methods for the control of such microorganisms are desirable.

Numerous species of fungi and bacteria are responsible for the degradation and deterioration of industrial products. The same applies to agriculture: in which case, nematodes and insects are also important.

Various microbiological agents have been suggested for use in the control of organisms discussed above, including fungi and bacteria. While these suggested agents have certain advantages when employed for a particular purpose and for a specific organism, the results have not been entirely satisfactory. For example, the organic mercury compounds are very effective when employed against certain specific bacteria but are expensive and toxic. Consequently, great care must be exercised in their use. As another example, chlorine is an effective microbicide but it is also very corrosive to many metals. A number of specific organic thiocyanates have long been used as insecticides (Donald E. H. Frear, "Chemistry of the Pesticides," third edition, D. Van Nostrand Company, Inc., New York, N.Y., 1955) but the use of these compounds as microbicides has heretofore been restricted. Marova, Voronkov, and Dolgov (Chemical Abstracts, 51, 13302b) have pointed out that the activity of methylene bisthiocyanate as a microbicide is equivalent to that of sodium pentachlorophenate, a well-known fungicide. In spite of the teachings of these authors, organic thiocyanates in general have not been widely used as microbicides. One reason for the limited use of these compounds in industry resides in the fact that most organic thiocyanates are ineffective against bacteria. In additon, organic thiocyanates are unstable. As a general rule, organic thiocyanates under the conditions present when they are used as a microbicide in industrial processes tend to decompose.

Thiocyanates are reactive groups which undergo a great variety of different transformations (N. Kharasch, "Organic Sulfur Compounds," vol. I, pp. 306–325, Pergamon Press, New York, N.Y., 1961, and E. E. Reid, "Organic Chemistry of Bivalent Sulfur," vol. VI, pp. 34–79, Chemical Publishing Co., Inc., New York, N.Y., 1965).

Thiocyanates can be cleaved at the carbon to sulfur bond

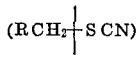

Cleavages of this type usually result in the formation of isothiocyanates or in the formation of products in which the thiocyanate group has been replaced. Oxidizing or reducing conditions usually result in the cleavage of the other sulfur to carbon bond in thiocyanates

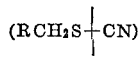

Hydrolysis and reaction with sulfites also result in the cleavage of this carbon to sulfur bond in thiocyanates. One of the products of these decompositions is hydrogen cyanide. Since hydrogen cyanide is one of the most poisonous substances known, extreme care must be exercised when an organic thiocyanates is used as a microbicide. This is especially true if the organic thiocyanate is used in a closed system. General safety precautions that should be observed when an organic thiocyanate is used as a microbicide as taught by the prior art are as follows:

(1) Air containing even faintly detectable amounts of hydrogen cyanide should not be inhaled. Under such conditions a hydrogen cyanide gas mask (containing an absorbent for hydrogen cyanide) should always be used. Ample ventilation should be provided in areas where hydrogen cyanide is used.

(2) Hydrogen cyanide should not be allowed to come in contact with the skin or clothing. If such contact accidentally occurs, the affected area should be deluged with cold water, the wet clothing should then be removed and the skin thoroughly washed with water, dilute ammonia, and again with water.

It is, therefore, a principal object of the present inveniton to provide a composition containing an organic thiocyanate useful for the control of microorganisms, fungi growth, bacteria, and other purposes, which obviates the disadvantages of the prior art.

It is another object of this invention to provide a composition for the control of organisms in industrial and agricultural process systems containing cellulosic, proteinaceous, and other biodegradable materials.

It is yet another object of our invention to provide a composition that is useful for sterilizing soil.

These and other objects and advantages of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

In brief, the foregoing objects and advantages are attained by adding a 2-hydroxy alkyl ester of an organic thiosulfonic acid having the formula:

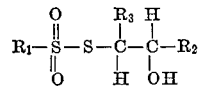

wherein $R_1$ and $R_2$ may be the same or different and represent a 1–12 carbon alkyl, substituted 1–12 carbon alkyl wherein the substituent is halogen or hydroxyl, aryl, substituted aryl wherein the substituent is alkyl, halogen, hydroxyl, or nitro, or an aralkyl radical, with the further characterization that $R_2$ may be hydrogen; and $R_3$ represents a 1–12 carbon alkyl or an aryl radical or hydrogen, to a microbicidal composition containing an organic thiocyanate. While we do not wish to be bound by any theory as to how this is accomplished, we believe that the organic thiosulfonate combines with the hydrogen cyanide and that the following explanation is substantially correct:

$RSO_2SCH_2CH_2OH + HCN \longrightarrow$

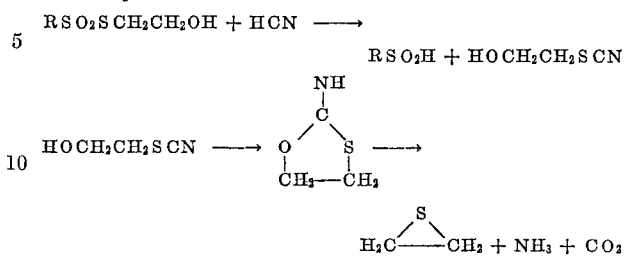

In addition to the ability of these compounds to combine with hydrogen cyanide, 2-hydroxy alkyl esters of organic thiosulfonic acids are effective bactericides. They have, however, little effect on fungi. We have found that these compounds are compatible in all proportions with organic thiocyanates, thus producing a composition that is effective against both bacteria and fungi. The latter is very important commercially because the microorganisms present in most industrial processes generally comprise several varieties of both bacteria and fungi.

As to the amount of microbicidal composition comprising the organic thiocyanate and the 2-hydroxy alkyl ester of an organic thiosulfonic acid which may be added to an aqueous system when used for the control of microorganisms, suitable quantities vary from 0.1 to 1,000 parts per million parts of water. If, however, the ratio of water to organic material is low, for example, 10 to 1 or less, the amount of the microbicidal composition to be added to the system varies from 0.1 to 1,000 parts per million parts of the organic material. When the composition is to be used for the treatment of soil or other agricultural purposes, for example, as a nematocide, it may be applied to the soil in an amount varying from about 5 to about 800 pounds per acre. In the composition, the organic thiocyanate content and that of the alkyl ester of the organic thiosulfonic acid may vary from 5–95 percent by weight and from 95–5 percent by weight, respectively. The foregoing percentages are based on the two components only; if a diluent or carrier or other substance is added, that additional component is disregarded.

The organic thiocyanates that may be used in our invention include any organic thiocyanates possessing microbicidal properties. Specific examples of such thiocyanates include, as illustrative thereof but not as a limitation, methylene bisthiocyanate and those which may be defined as S-thiocyanomethyl compounds of 2-mercaptobenzothiazole, 2 - mercaptobenzoxazole, and 2-mercaptobenzimidazole, having the general formula:

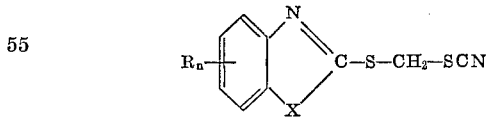

wherein X is O, NH, or S; R is hydrogen, halogen, nitro, alkyl, amino, or hydroxyl; and $n$ is 1 or 2.

These S-thiocyanomethyl compounds are prepared by reacting a metal salt, preferably an alkali-metal salt, and more preferably the sodium salt of 2-mercaptobenzothiazole, 2-mercaptobenzoxazole, 2-mercaptobenzimidazole, or substituted compounds thereof wherein one or two of the hydrogens attached to the aromatic ring are replaced by halogen, nitro, alkyl, amino, or hydroxyl radicals with chloromethylthiocyanate in an alcoholic solution. Since the reaction between the 2-mercapto compound and the chloromethylthiocyanate is equimolecular, we generally prefer to employ these two reactants in approximately equal molecular proportions. The reaction may be effected at relatively low temperatures.

These compounds are liquids or solids which are soluble in common organic solvents such as alkyl and aromatic hydrocarbons, alcohols, ketones, esters, ether alcohols, dimethylformamide, dimethylsulfoxide, and other solvents. The addition of a surfactant to the liquid or to the solution renders these compounds readily dispersible in water. In general, nonionic dispersants are preferred. Examples of such preferred nonionic dispersants include alkylphenoxypolyoxyethylene ethanol or alkylpolyoxyethylene ethanol.

When methylene bisthiocyanate is employed as the microbicide in our invention, it is generally desirable to use a composition comprising, in addition to methylene bisthiocyanate, a dispersant and a dimethylamide as disclosed in U.S. Pat. 3,306,810 issued Feb. 28, 1967.

The 2-hydroxy organic thiolsulfonates of the present invention are prepared by reacting a metal salt, preferably the sodium salt of thiolsulfonic acid with a 2-chloroalcohol.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Preparation of 2-(thiocyanomethylthio)benzothiazole

The sodium 2-mercaptobenzothiazole used in this example was prepared by reacting 258.5 grams (1.54 moles) of a commercial grade 2-mercaptobenzothiazole with 102.8 grams (1.51 moles) of sodium ethoxide in about 400 milliliters of absolute denatured alcohol (ethanol denatured with isopropanol and methanol). This solution was cooled by means of an ice bath so as to maintain the temperature below 40° C. and treated with 162.4 grams (1.51 moles) of chloromethylthiocyanate. The reaction mixture was maintained at a temperature of 35° to 40° C. overnight and then allowed to stand for a period of 15 days at room temperature. At the end of this period, the reaction mixture was filtered to remove the precipitated sodium chloride. The filter cake was washed first with denatured alcohol and then with methylene chloride. After combining the filtrate and the denatured alcohol wash liquor, an oil layer separated from the mixture. The oil layer so obtained was dissolved in methylene chloride and then the resulting solution was combined with the methylene chloride wash liquor, washed with water, and dried with anhydrous magnesium sulfate. The methylene chloride was removed by evaporation to yield 118.0 grams of 2-(thiocyanomethylthio)benzothiazole as an oily liquid. An additional 242.1 grams of 2-(thiocyanomethylthio)benzothiazole was recovered from the alcohol phase by extraction with methylene chloride. Experimentally the alcohol phase was diluted with water and extracted three times with methylene chloride; the methylene chloride extracts were combined and dried over anhydrous magnesium sulfate. After evaporating the methylene chloride, the 2-(thiocyanomethylthio)benzothiazole remained as a residue, a product which could not be distilled without decomposition even at reduced pressure or recrystallized. The infrared spectrum contained a strong band at 4.62 microns, which is indicative of an organic thiocyanate.

*Analysis.*—Calcd. for $C_9H_6N_2S_3$ (percent): N, 11.8; S, 40.3. Found (percent): N, 11.0; S, 39.5.

EXAMPLE 2

Preparation of 2-(thiocyanomethylthio)benzoxazole

A 250-ml. three-neck, round-bottom flask equipped with stirrer, addition funnel, and thermometer was charged with 150 milliliters of absolute ethanol and 2.3 grams (0.1 mole) of sodium. After the sodium had dissolved, 15.1 grams (0.1 mole) of 2-mercaptobenzoxazole was added and the mixture stirred until a complete solution was obtained. The stirred reaction mixture was cooled and 10.75 grams (0.1 mole) of chloromethylthiocyanate was added dropwise. After the addition was complete, the reaction mixture was stirred at room temperature overnight, then poured into 1.5 liters of water and extracted with four 150-ml. portions of ethyl acetate. The ethyl acetate extracts were combined and washed successively with one 500-ml. portion of water, one 500-ml. portion of two percent sodium hydroxide and one 500-ml. portion of water. The ethyl acetate extract was dried over magnesium sulfate and the ethyl acetate removed under reduced pressure. The residue, a dark oil (14.1 grams), $n_D^{25}$ 1.6372 represented a 63.5 percent yield of a crude product. A portion of this material was distilled under reduced pressure to give 2-(thiocyanomethylthio) benzoxazole as a clear liquid, B.P. 154–6° C./0.2 mm., $n_D^{25}$ 1.6427. The infrared spectrum contained a strong band at 4.62 microns, which is indicative of an organic thiocyanate.

*Analysis.*—Calcd. for $C_9H_6N_2OS_2$ (percent): S, 28.82. Found (percent): S, 29.30.

EXAMPLE 3

Preparation of 2-(thiocyanomethylthio)benzimidazole

A 500-ml. four-neck, round-bottom flask equipped with stirrer, addition funnel, condenser, and thermometer was charged with 300 milliliters of absolute ethanol and 4.6 grams (0.2 mole) of metallic sodium. After the sodium had dissolved, 30.0 grams (0.2 mole) of 2-mercaptobenzimidazole was added and then 21.5 grams (0.2 mole) of chloromethylthiocyanate was added dropwise over a period of five minutes as the stirred solution was cooled. A tan precipitate formed almost immediately and the reaction mixture was stirred at room temperature overnight, then poured into two liters of water and the solid removed by filtration. The dried crude 2-(thiocyanomethylthio)benzimidazole, 35.1 grams (79.4 percent yield) was recrystallized from toluene to give a pure sample of 2-(thiocyanomethylthio)benzimidazole, M.P. 144–5.5° C.

*Analysis.*—Calcd. for $C_9H_7N_3S_2$ (percent): S, 28.97. Found (percent): S, 28.94.

EXAMPLE 4

Preparation of 2-hydroxyethyl methanethiolsulfonate

Into a one-liter, four-neck flask, fitted with a condenser, mechanical stirrer, and thermometer, was placed 396 grams (0.5 mole) of a 16.9 percent solution of sodium methanethiolsulfonate. The reaction mixture was concentrated to a 25 percent sodium methanethiolsulfonate solution by distillation. The resulting mixture was neutralized with concentrated sulfuric acid to pH 7 and the solution evacuated under reduced pressure at room temperature in order to remove any dissolved gases. The resulting mixture was stirred while 44.3 grams (0.55 mole) of 2-chloroethanol was being added and then heated to reflux for six hours. On cooling, the reaction mixture was extracted three times with 100-ml. portions of methylene chloride. The methylene chloride was removed by evaporation to give 77 grams of crude 2-hydroxyethyl methanethiolsulfonate assaying 88.2 percent pure.

EXAMPLE 5

The effectiveness of several compositions against *Aerobacter aerogenes* was tested by the pulp-substrate method described in U.S. Pat. 2,881,070, which disclosure is hereby made a part of this application, using *Aerobacter aerogenes* and pulp substrates that where buffered to pH values of 5.5, 6.5, and 7.5, respectively. The results are listed in Table 1.

The three compositions which were used in this example are as follows:

(A) Composition consisting of a solution of 60.0 percent by weight of 2-(thiocyanomethylthio)benzothiazole.

(B) Composition consisting of a solution of 40.0 percent by weight of 2-(thiocyanomethylthio)benzothiazole and 35.0 percent by weight of 2-hydroxyethyl methanethiolsulfonate.

(C) 2-hydroxyethyl methanethiolsulfonate.

TABLE 1

[Percentage kill of *Aerobacter aerogenes* in a pulp substrate at pH 5.5, 6.5, and 7.5 at 18 hours contact with compositions A, B, and C.]

| pH | Concentration (parts per million) | Compositions tested | | |
|---|---|---|---|---|
| | | A (percent kill) | B (percent kill) | C (percent kill) |
| 5.5 | 0.1 | 0 | 81 | |
| | 0.3 | 16 | 98 | |
| | 0.5 | 9 | 99 | 99.9 |
| | 1 | 3 | 99.7 | 99.9 |
| | 2 | 0 | 100 | 100 |
| | 4 | 2 | | 100 |
| | 8 | 9 | | 100 |
| | 25 | | | 100 |
| 6.5 | 0.3 | 0 | 76 | |
| | 0.5 | 0 | 97 | 91 |
| | 1 | 4 | 99 | 98 |
| | 2 | 0 | 99 | 99 |
| | 4 | 4 | 99.9 | 99.6 |
| | 8 | 28 | | 99.9 |
| | 12 | 18 | | 100 |
| 7.5 | 0.5 | 0 | | 91 |
| | 1 | 0 | | 98 |
| | 2 | 0 | 11 | 99 |
| | 4 | 0 | 94 | 98.6 |
| | 8 | 22 | 87 | 99.9 |
| | 12 | 3 | 95 | 100 |

EXAMPLE 6

The effectiveness of several compositions on the three fungi *Penicillium roqueforti, Chaetomium globosum,* and *Aspergillus niger* was tested by the pulp-substrate method described in U.S. Pat. 3,356,706, which disclosure is hereby made a part of this application. The results for the three compositions listed in Example 5 are listed in Table 2. Growth was recorded on the basis of the following key:

4=excellent
3=good
2=poor
1=very poor, scant, questionable
0=no growth

TABLE 2

[Inhibition of *Penicillium roqueforti, Chaetomium globosum,* and *Aspergillus niger* by compositions A, B, and C in a pulp substrate after 14 days incubation]

| Test organism | Concentration (parts per million) | Compositions tested | | |
|---|---|---|---|---|
| | | A (growth) | B (growth) | C (growth) |
| *Penicillium roqueforti* | 1 | 4 | | 4 |
| | 3 | 1 | 3 | 4 |
| | 5 | 0 | 2 | 4 |
| | 7 | 0 | 0 | 4 |
| | 10 | 0 | 0 | 4 |
| | 15 | 0 | 0 | 4 |
| | 25 | 0 | 0 | 4 |
| | 50 | 0 | | 4 |
| *Aspergillus niger* | 1 | 4 | | 4 |
| | 3 | 4 | 2 | 4 |
| | 5 | 2 | 0 | 4 |
| | 7 | 0 | 0 | 4 |
| | 10 | 0 | 0 | 4 |
| | 15 | 0 | 0 | 4 |
| | 25 | 0 | 0 | 4 |
| | 50 | 0 | | 4 |
| *Chaetomium globosum* | 1 | 4 | | 4 |
| | 3 | 2 | 2 | 4 |
| | 5 | 0 | 0 | 4 |
| | 7 | 0 | 0 | 4 |
| | 10 | 0 | 0 | 4 |
| | 15 | 0 | 0 | 3 |
| | 25 | 0 | 0 | 3 |
| | 50 | 0 | | 3 |

EXAMPLE 7

A 1.0-gram sample containing $2.5 \times 10^{-3}$ equivalent of 2-(thiocyanomethylthio)benzothiazole capable of decomposing to yield 6,500 micrograms of cyanide ion was placed in a 250-ml. three-necked, round-bottom flask with 100 milliliters of water. The rapidly stirred mixture was heated at 70° C. for three hours while nitrogen was passed over the surface of the mixture and the exit gases absorbed in 100 milliliters of 0.1 N sodium hydroxide. Analysis of the 0.1 N sodium hydroxide solution for cyanide ion (Aldridge, Analyst, 69, 262, 1944) showed 1,200 micrograms of cyanide ion was formed. Another sample containing $2.5 \times 10^{-3}$ equivalent of 2-(thiocyanomethylthio)benzothiazole and $3.5 \times 10^{-3}$ equivalent of 2-hydroxypropyl methanethiolsulfonate produced only 140 micrograms of cyanide. This demonstrated that the presence of the thiolsulfonate in the sample reduced the hydrogen cyanide evolution to 12 percent of that evolved when no thiolsulfonate was present.

EXAMPLE 8

The procedure of Example 7 was repeated except $3.4 \times 10^{-3}$ equivalent of 2-hydroxyethyl methanethiolsulfonate was substituted for $3.5 \times 10^{-3}$ equivalent of 2-hydroxypropyl methanethiolsulfonate used in that example. No detectable amount of cyanide was found when the thiocyanate was heated in the presence of the 2-hydroxyethyl methanethiolsulfonate.

EXAMPLE 9

A sample containing a mixture of beta-butoxy-beta'-thiocyanodiethyl ether and beta-thiocyanoethyl esters of aliphatic fatty acids containing 10 to 18 carbon atoms capable of decomposing to yield approximately 83,000 micrograms of cyanide ion was treated at 100° C. for two hours by the same method as described in Example 7 and 3,500 micrograms of cyanide ion was formed. When $4.6 \times 10^{-2}$ equivalent of 2-hydroxyethyl methanethiolsulfonate was added to the sample, 500 micrograms of cyanide ion was formed. Stated another way, the presence of the thiolsulfonate in the sample reduced the hydrogen cyanide evolution to about 15 percent of that evolved when no thiolsulfonate was present.

EXAMPLE 10

A sample containing $1.54 \times 10^{-2}$ equivalent of methylene bisthiocyanate capable of decomposing to yield 40,000 micrograms of cyanide ion was treated by the same method as described in Example 7 and 650 micrograms of cyanide ion was formed. A similar sample containing $1.54 \times 10^{-2}$ equivalent of methylene bisthiocyanate and $2.54 \times 10^{-2}$ equivalent of 2-hydroxyethyl methanethiolsulfonate produced 300 micrograms of cyanide ion. The presence of the thiolsulfonate in the sample reduced the evolution of hydrogen cyanide to about 46 percent of that evolved when no thiolsulfonate was present.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

We claim:

1. A bactericidal and fungicidal composition comprising 5–95 percent by weight of 2-(thiocyanomethylthio)benzothiazole and 95–5 percent by weight of a 2-hydroxy alkyl ester of an organic thiolsulfonic acid selected from the group consisting of 2-hydroxyethyl methanethiolsufonate and 2-hydroxypropyl methanethiolsulfonate.

2. A bactericidal and fungicidal composition comprising 5–95 percent by weight of 2-(thiocyanomethylthio)benzoxazole and 95–5 percent by weight of a 2-hydroxy alkyl ester of an organic thiolsulfonic acid selected from the group consisting of 2-hydroxyethyl methanethiolsulfonate and 2-hydroxypropyl methanethiolsulfonate.

3. A bactericidal and fungicidal composition comprising 5–95 percent by weight of 2-thiocyanomethylthio)benzimidazole and 95–5 percent by weight of a 2-hydroxy alkyl ester of an organic thiolsulfonic acid selected from the group consisting of 2-hydroxyethyl methanethiolsulfonate and 2-hydroxypropyl methanethiolsulfonate.

4. A bactericidal and fungicidal composition comprising 5–95 percent by weight of methylene bisthiocyanate and 95–5 percent by weight of a 2-hydroxy alkyl ester of an organic thiolsulfonic acid selected from the group consisting of 2-hydroxyethyl methanethiolsulfonate and 2-hydroxypropyl methanethiolsulfonate.

5. A bactericidal and fungicidal composition comprising 5–95 percent by weight of a fungicidal organic thiocyanate selected from the group consisting of 2-(thiocyanomethylthio) benzothiazole, 2-(thiocyanomethylthio) benzoxazole, 2-(thiocyanomethylthio) benzimidazole and methylene bisthiocyanate and 95–5 percent by weight of 2-hydroxyethyl methanethiolsulfonate.

6. A bactericidal and fungicidal composition comprising 5–95 percent by weight of a fungicidal organic thiocyanate selected from the group consisting of 2-(thiocyanomethylthio) benzothiazole, 2-(thiocyanomethylthio) benzoxazole, 2-(thiocyanomethylthio) benzimidazole and methylene bisthiocyanate and 95–5 percent by weight of 2-hydroxypropyl methanethiolsulfonate.

References Cited
UNITED STATES PATENTS

| | | | |
|---|---|---|---|
| 2,877,258 | 3/1959 | Hardy et al. | 424—303 |
| 3,306,810 | 2/1967 | Buckman et al. | 252—8.55 D |
| 3,463,785 | 8/1969 | Buckman et al. | 260—306.6 |

ALBERT T. MEYERS, Primary Examiner

V. D. TURNER, Assistant Examiner

U.S. Cl. X.R.

424—272, 273, 302, 303